United States Patent [19]

Hosoya et al.

[11] Patent Number: 4,977,208

[45] Date of Patent: Dec. 11, 1990

[54] WATER-ABSORBENT COATING COMPOSITIONS

[75] Inventors: Yoshio Hosoya; Naotaka Watanabe, both of Tokyo; Isao Takagi, Hyogo; Atsuo Miyoshi, Hyogo, all of Japan

[73] Assignee: Mitsui-Cyanamid, Ltd., Tokyo, Japan

[21] Appl. No.: 353,327

[22] Filed: May 16, 1989

[30] Foreign Application Priority Data

May 20, 1988 [JP] Japan ................................. 63-121843
May 20, 1988 [JP] Japan ................................. 63-121844

[51] Int. Cl.$^5$ ....................... C08L 31/04; C08L 33/08
[52] U.S. Cl. .................................... 524/515; 524/523; 524/524; 524/525; 524/511; 524/512; 523/337
[58] Field of Search ............... 524/511, 512, 525, 524, 524/523, 515; 523/337

[56] References Cited

U.S. PATENT DOCUMENTS 4,013,606  3/1977  Ballweber et al. ................... 524/512
4,339,371  7/1982  Robinson et al. .................... 524/310

OTHER PUBLICATIONS

"Encyclopedia of Polymer Science and Engineering", 2nd ed. vol. 3, p. 615, John Wiley & Sons (1985), esp. p. 629.

"Toryo to Toso" (Translation in Revoke of Applicant). "Paint and Coating", p. 187; The Power Co., 1985.

Primary Examiner—Joseph L. Schofer
Assistant Examiner—John J. Guarriello
Attorney, Agent, or Firm—Wenderoth, Lind & Ponack

[57] ABSTRACT (A) Water-absorbent coating compositions comprising (1) a nonaqueous dispersion of a resin, or a solution of a resin, and (2) a water-in-oil type emulsion of a water-swellable polymer with an average particle size not greater than 10 μm; and a process for coating the same which uses a proper primer. (B) Water-absorbent coating compositions which comprise 100 parts by weight (on dry basis) of a resinous solution and 10 to 150 parts by weight (on solid basis) of a dehydrated water-in-oil type emulsion of a water-swellable polymer with an average particle size not greater than 10 μm and which gives coated film with an elongation not lower than 30%.

7 Claims, No Drawings

WATER-ABSORBENT COATING COMPOSITIONS

BACKGROUND OF THE INVENTION

1. Field of the Invention

This invention relates to water-absorbent coating compositions to be applied to wall covering materials required to prevent dew condensation or to be wettable with water, and to a coating process using the same.

2. Description of the Background Art

Conventional water-absorbent coating compositions, known as dew-condensation preventing paint, comprise a polymer emulsion, a polymer solution, and a porous, water-absorbent pigment ( such as calcium carbonate, diatomaceous earth, vermiculite and perlite ) or a water-absorbent resin.

Those containing water-absorbent pigment have to be coated to a relatively large thickness. Those containing a water-absorbent resin, which is a powder not smaller than several tens of microns in size, also have to be coated to a relatively large thickness, and the coated film is poor in surface smoothness; in addition, the manufacturing process involves a special step for dispersing the powder of resin.

SUMMARY OF THE INVENTION

The object of this invention is to provide stable coating compositions which will give a coated film of high water absorptivity, preventing dew condensation and beautiful smooth appearance, and to provide an effective coating process using the same.

Water-in-oil type emulsions of water-swellable polymer and dehydrated products thereof are 10 μm or less in average particle size and insoluble in water, and are therefore suitable as a component that will give a coated film a capacity of absorbing and releasing water to serve as a dewcondensation preventing agent, as well as a beautiful and smooth surface. However, dispersions of this type have a narrow choice of the resin solutions to be used in combination, particularly for use in general-purpose building paint of the one-pack type.

(A) It was found that, if a water-in-oil type emulsion of a water-swellable polymer is used in combination with a nonaqueous dispersion of a resin ( NAD ), the water-absorbent particles of the former emulsion will be disposed among the NAD particles to form a stable dispersion system and the resulting composition gives a coated film which remains stable even when water is absorbed thanks to the moderate flexibility of NAD. This invention (A) was accomplished on the basis of these findings.

Thus, this invention (A) relates to a water-absorbent resinous coating composition comprising 100 parts by weight ( on solid basis ) of a nonaqueous dispersion of a resin ( NAD ) and 8~150 parts, preferably 20~80 parts, by weight ( on solid basis ) of a water-in-oil type emulsion of a water-swellable polymer with an average particle size not greater than 10 μm.

(B) Water-in-oil type emulsions of water-swellable polymer are not sufficiently stable as paint; resinous solutions form continuous coated film, which does not show desirable characteristics when cycles of swelling ( upon absorption of water ) and contraction ( upon releasing of absorbed water ) are repeated; and when the emulsion of a waterswellable polymer is used in larger amounts, adhesion of the coated film to the substrate tends to lower when cycles of swelling and contraction are repeated.

This invention (B) is directed to solving the problems mentioned above, and relates to a water-absorbent coating composition which comprises 100 parts by weight ( on solid basis ) of a resinous solution and 10~150 parts by weight ( on solid basis ) of a dehydrated water-in-oil type emulsion of a water-swellable resin and which will give coating film with an elongation not lower than 30%. This invention also relates to a coating process which comprises applying a primer on a substrate and then applying a top coating, wherein said top coating is a water-absorbent coating composition as defined in the inventions (A) and (B) and said primer is a material which is well compatible with the top coating or shows a high interlaminar strength with the top coating.

DETAILED DESCRIPTION OF THE INVENTION

Detailed below is this invention (A).

As examples of the NAD resin that can be used in this invention, there may be mentioned those prepared by polymerizing at least one polymerizable monomer ( such as acrylic monomers, styrene and vinyl acetate ) in a solvent in which the monomers are soluble but the resulting polymer is insoluble, and those prepared by polymerizing a vinyl monomer in an alkyd resin.

As the above-mentioned solvent, may be preferably used those composed mainly of mineral turpentine, naphtha or the like. As examples of commercially available NAD resins, there may be mentioned Acrydic A-185 ( DIC ), Acrydic A-186 ( DIC ), Acrydic A-187 ( DIC ) and Paraloid NAD-10 ( Rohm & Haas ).

In order to ensure better pigment dispersion, viscosity adjustment and regulation of coated-film characteristics, may also be used, in combination with the NAD, a solution of a polymer prepared by polymerizing at least one monomer soluble in an aliphactic or petroleum naphtha solvent ( such as acrylic monomers, styrene, vinyl monomers and vinyl acetate ), a solution of an acrylated alkyd resin, or a solution of an alkyd resin. Preferable acrylic monomers include isobutyl methacrylate and butyl methacrylate.

As examples of acrylic resins, there may be mentioned Acrydic-188 ( DIC ) and Acrydic-189 ( DIC ). The preferable mixing ratio of this resinous solution to NAD is such that the content of the former is up to 50% ( on solid basis).

The water-in-oil type emulsion of a water-swellable polymer is an emulsion prepared by emulsifying an aqueous solution of a water-soluble vinyl monomer and a crosslinkable monomer in an organic dispersion medium by the aid of a hydrophobic surface-active agent, and polymerizing the monomer emulsion thus obtained by the use of a free-radical initiator. Further it may be prepared by dehydrating the emulsion during and/or after polymerization to a water content less than 25% based on the weight of polymer. It may also contain, as required, a hydrophilic surface-active agent.

The emulsion thus obtained consists of 25 to 75% by weight of water-swellable polymer particles, 20 to 70% by weight of organic dispersion medium, 0.5 to 5% by weight of hydrophobic surface-active agent and 0 to 5% by weight of hydrophilic surface-active agent, and the average particle size of the water-swellable polymer is 10 μm or less, preferably 5 μm or less.

The water-soluble vinyl monomer is selected from nonionic vinyl monomers, anionic vinyl monomers and cationic vinyl monomers.

Illustrative examples of the nonionic vinyl monomers include (meth)acrylamide, vinyl methyl ether, vinyl ethyl ether and vinylpyrrolidone. Typical examples of the anionic vinyl monomers include (meth)acrylic acid, 2-acryl-amido-2-methylpropanesulfonic acid, vinylsulfonic acid, styrenesulfonic acids, itaconic acid, maleic acid, fumaric acid and allylsulfonic acid. As examples of cationic vinyl monomers may be mentioned acid addition salts and quaternary salts of dialkylaminoalkyl (meth)acrylates, such as dimethylaminoethyl (meth)acrylate and diethylaminoethyl (metha)acrylate; and dialkylaminoalkyl-(meth)acrylamides, such as dimethylaminomethyl-(meth)acrylamide and dimethylaminopropl(meth)acrylamide.

The crosslinkable monomer is the one copolymerizable with the water-soluble vinyl monomers mentioned above. Typical examples include divinyl compounds, such as N,N'-methylene-bis-(meth)acrylamide, divinylbenzene and vinyl (meth)acrylate; methylol vinyl compounds, such as methylol(meth)acrylamide; vinyl aldehyde compounds, such as acrolein; and methylacrylamide glycolate methyl ether.

The amount of water-swellable polymer to be used must be in the range from 8 to 150% based on the weight of NAD ( on solid basis ). When the amount is less than 8%, the effect of preventing dew condensation and the wettability with water are insufficient. If the amount exceeds 150%, on the other hand, coated film softens excessively upon absorbing water, often causing blistering and bad stability. The preferable amount is in the range from 20 to 80%.

The pigment that can be used in combination includes diatomaceous earth, calcium carbonate, porous pigment, colored inorganic pigment ( e.g., titanium oxide ), organic pigment, and extender pigment ( e.g., precipitated barium sulfate, talc and kaolin ). It is preferable to employ the dehydrated product of an emulsion of a water-swellable polymer when pigment is added.

Mildewicides and other additives commonly used in paint may also be added. The coating compositions thus prepared can be applied, directly or in combination with a proper primer, to inorganic building materials ( e.g., concrete, mortar, plasterboards and slates ), metallic building materials ( e.g., aluminum and processed steel plates ), plastic materials and others.

Next is detailed this invention (B).

To achieve the purpose of this invention, it is necessary that coated film has a high water absorptivity and retains its good characteristics upon absorption of water and upon releasing the absorbed water.

To meet these requirements, it is very favorable to adopt the combination of a resinous solution with a dehydrated water-in-oil type emulsion of a water-swellable polymer ( WF-E ). The suitable mixing ratio is 10 to 150%, preferably 30 to 70%, of WF-E based on the weight of resinous solution ( on solid basis ).

The resins used in this invention in the form of a solution are those commonly employed as paint, typical examples including alkyd resins, modified alkyd resins, polyurethanes, acrylic resins, epoxy resins, polyesters, and melamine alkyd resins. A suitable one is selected from these, case by case, so that the resinous composition prepared by combination with WF-E will give coated film with an elongation of 30% or higher, preferably 50 to 200%. Desirable coated film can thus be obtained, which retains its good characteristics even when elongation and contraction are repeated upon absorption of water and upon releasing the absorbed water. A lower elongation of coated film will result in a lower water absorptivity.

Elongation of the coated film was measured as described below. A coating composition being tested was coated on a polyethylene plate by means of an applicator or a spraygun to a dry thickness of about 70 $\mu$, the wet film was dried at 60° C. for 40 minutes, and the dry film was allowed to stand for 24 hours and shred into strips 1 cm wide by means of a cutter. Each of the specimens thus prepared was pulled at a rate of 4 mm/min by using an autographic recording device to measure its elongation.

Dehydrated water-in-oil type emulsion of a waterswellable polymer is prepared by emulsifying an aqueous solution of at least one water-soluble vinyl monomer and at least one crosslinkable monomer in an organic dispersion medium containing a hydrophobic suraface-active agent, polymerizing the monomer emulsion thus obtained by the use of a free-radical initiator, and dehydrating the emulsion during and/or after polymerization under reduced pressure. A hydrophilic surface-active agent may also be added to the system as required.

As the water-soluble vinyl monomers and crosslinkable monomers, may be used the compounds mentioned above in the explanation of this invention (A).

The emulsion thus obtained contains at least 30%, preferably 45 to 70% based on the total weight of the emulsion, by weight of water-swellable polymer particles having an average size of 10 $\mu$m or less,/preferably 5 $\mu$m or less, and the water content is less than 25%. A higher water content can result in emulsion breakdown when a resinous solution or pigment is added.

The water content is represented by the following equation:

$$\text{Water content (\%)} = \frac{\text{Weight of water}}{\text{Weight of polymer}} \times 100$$

Next is detailed the coating process in this invention.

The coating composition thus prepared can be directly applied to substrates for some uses. However, it is preferable to use a primer comprising the same type of resin as that in this composition, or a resin having a high interlaminar strength, in order to fully exhibit the characteristics of this composition.

WF-E, upon absorption of water, causes swelling of the coated film, and tends to adversely affect its adhesion when the coating composition is directly applied to substrate. This tendency is particularly marked when the emulsion of water-swellable polymer is contained in an amount of 20% or more. It was found that use of a proper primer can eliminate such adverse effects of swelling and contraction. The best result is obtained by applying the top coating when the primer is semi-cured.

The primer used is of various types: resins of the same type as those in the top coating compositions deprived of the water-absorbent resin ( 1P, 2P and 3P in Table 1 ); etching primers ( wash primers ); and epoxy and modified epoxy resins ( when the top coating is a urethane resin ). Illustrative examples include Eton-2100 Primer ( Kawakami Paint Mfg. Co., Ltd. ) and UP Primer ( Kawakami Paint ).

As the pigment that can be added to the water-absorbent coating compositions of this invention, may be mentioned porous Pigment ( e.g., perlite and diatomaceous earth ), calcium carbonate, titanium oxide and other extender pigment, and colored organic and inorganic pigment, which are used in such amounts as not to affect the elongation of coated film. Other additives commonly used in paint, such as antifoamers, leveling agents and anti-settling agents, may also be used.

In addition, powder of a water-absorbent polymer may also be used as pigment in some cases.

The thickness of coated film may vary with the type of coatings, but should preferably be in the range from 30 to 250 μm on dry basis to ensure high water absorptivity. Too thin film is poor in water absorptivity, while too thick a film takes a long time for releasing absorbed water.

The coating compositions and the coating process using the same as described above can be applied to metals, plastics, wood and composite materials, and render the coated materials water-absorbent or wettable with water.

As is apparent from the foregoing, this invention provides a method of effectively preventing dew condensation, and also provides coated film of high water absorptivity by the use of a dehydrated emulsion of a waterswellable polymer with a water content less than 20% and of a proper primer.

The following examples will further illustrate the invention.

EXAMPLE 1 [EXAMPLES OF INVENTION (A)]

Described below are Preparative Examples for water-in-oil type emulsions of water-swellable polymers used in this invention (A).

(1) A mixture of 0.15 g N,N'-methylene-bis-acrylamide, 683 g of 57% aqueous solution of acrylic acid stoichiometrically neutralized with ammonia, 240 g of an organic dispersion medium ( a paraffinic oil ) and 18g sorbitan monooleate ( HLB: 4.3 ) was emulsified in a homogenizer. The emulsion thus obtained was transferred to a four-necked flask and deaerated by introducing nitrogen gas with stirring. A free-radical initiator was then added dropwise under a nitrogen gas stream, and polymerization was carried out at 60° C. At the end of reaction, 27 g polyoxyethylene lauryl ether ( HLB: 12.1 ) was added, and the mixture was stirred well, giving an emulsion with a viscosity of 330 cps/25° C. ( measured with a Brookfield viscometer; No.2 rotor, 12rpm ) and an average particle size of 3.8 μm [polymer (I)].

(2) An aqueous solution ( 670 g ) containing 250 g sodium acrylate, 0.12 g N,N'-methylene-bis-acrylamide and 0.012 g tert-butyl hydroperoxide was added to 220.8 g of an organic dispersion medium ( a paraffinic oil ) containing 22.5g of a hydrophobic surface-active agent ( sorbitan monooleate; HLB: 4.3 ), and the mixture was emulsified in a homogenizer. The emulsion thus obtained was transferred to a four-necked flask and deaerated by introducing nitrogen gas with stirring. A 2% aqueous solution of sodium metabisulfite ( 5 ml ) was then added dropwise, and polymerization was effected by heating at 60° C. for three hours. The resulting emulsion was cooled, and then dehydrated at 40° to 80° C. under a reduced pressure of 80 to 40 mmHg, recovering 391 g of distilled water. The polymer emulsion thus obtained was stable, and contained 50% by weight of water-swellable polymer. Its average particle size was 3.6/μm and the water content of the polymer was 10% [polymer (II)].

(3) Emulsions of water-swellable polymers as shown in Table 1 [polymers (III) and (IV)]were obtained in a similar way.

EXAMPLE 2 [EXAMPLES FOR INVENTION (A)]

Coating compositions of the formulations as shown in Table 2 were prepared by using polymers I through IV, and their characteristics were evaluated.

Those containing pigment were prepared by treating a mixture of acrylic resinous solution, pigment and solvent in a quick mill for 30 minutes to effect dispersion, followed by addition of NAD and additives for a one-pack paint.

Those containing no pigment were prepared by adding an emulsion of a water-swellable polymer to NAD with stirring, followed by addition of common additives.

The external wall of a 2-liter round can ( with its internal wall previously coated with paint ) was coated with a wash primer and then with a coating composition prepared above to a dry thickness of 60 to 80 μ, and dried at 70° C. for 60 minutes. After being charged with ice-cooled water, the can was allowed to stand at room temperature ( 20° to 25° C. ) and at a humidity of 75 to 80% for 30 minutes, and the appearance of the coated external wall was observed in comparison with that of an untreated can. The result is shown in Table 2, in which represents no dew condensation with some whitening, represents no dew condensation with some wetting, Δ represents slight dew condensation, and χ represents dew condensation.

EXAMPLE 3 [EXAMPLES OF INVENTION (B)]

Described below are Preparative Examples for dehydrated water-in-oil type emulsions of water-swellable polymers used in this invention (B).

PREPARATIVE EXAMPLE (1) (POLYMER 1 )

A mixture of 1340 g of an aqueous solution containing 500 g sodium acrylate, 0.25 g N,N'-methYlene-bis-acrylamide and 0.02 g tert-butyl hydroperoxide with 442g of an organic dispersion medium ( a paraffinic oil; b.p.: 208°–242° C. ) containing 45 g of a hydrophobic surface-active agent ( sorbitan monooleate; HLB: 4.3 ) was emulsified in a homogenizer.

The emulsion thus obtained was transferred to a four-necked flask and deaerated by introducing nitrogen gas for one hour with stirring. Polymerization was carried out by heating at 60° C. for four hours while adding dropwise a 2% aqueous solution of sodium metabisulfite. After cooling, 500 g of an aliphatic hydrocarbon having a boiling point lower than that of the above dispersion medium ( b.p.: 155°–177° C.) was added, and the mixture was subjected to azeotropic dehydration at 40° to 80° C. under a reduced pressure of 80 to 40 mmHg to distill off 782 g of water and the alifatic hydrocarbon.

The stable emulsion thus obtained contained 50% by weight of water swellable polymer, the average particle size was 3.8.μm, and the water content was 10% by weight.

PREPARATIVE EXAMPLE (2) (POLYMER 2 )

An emulsion was prepared in much the same manner as in Preparative Example (1) except that azeotropic dehydration was stopped when 673 g water was distilled off. The emulsion thus obtained contained 45.1% by weight of water-swellable polymer, the average particle size was 4.0 μm, and the water content was 25% by weight.

PREPARATIVE EXAMPLES (3) and (4) (POLYMERS 3 and 4)

Polymers 3 and 4 were prepared in much the same manner as in Preparative Example (1) except that acrylamide and the quaternary salt of dimethylaminoethyl methacrylate with methyl chloride were used as vinyl monomer. Table 3 shows the compositions and properties of these polymers. Coating compositions as listed in Table 4 were prepared by using polymers 1 through 4. For those containing pigment, it was first mixed with equal weights of resin and solvent, the mixture was treated in a beaker-type sand mill for 20 minutes to effect dispersion, and the remaining resin and solvent were added. After that, each of the polymers (1 through 4) was added with mild stirring, and stirring was further continued for five minutes using a disper. Water absorptivity was evaluated by applying a coating composition on an aluminum plate (0.8mm×7cm×15cm), placing the coated plate (after drying) on a can filled with ice-cooled water in close contact with its surface, and observing dew condensation and film appearance after 30 minutes.

EXAMPLE 4 [EXAMPLE FOR INVENTION (B)]

Each of coating compositions No.1—1, 1—3 and 1—4 (100 parts) was diluted with 50 parts of a thinner (consisting of 60% xylene, 15% toluene, 10% ethyl acetate and 15% butyl acetate), coated to a dry thickness of 60 μm, and dried at 70° C. for 30 minutes.

All the samples showed good test results, with no dew condensation observed although slight lifting of coated film was observed after 60 minutes.

COMPARATIVE EXAMPLE 1 [EXAMPLE OF INVENTION (B)]

Coating composition No.1-2 was tested in the same manner as above. Breakdown of emulsion took place, and no applicable paint could be obtained. This is due to the excessively high water content of polymer 2.

EXAMPLE 5 [THIS INVENTION (B)]

Coating composition No.1P was diluted with the same thinner at the same ratio as in Example 4, spray-coated to a dry thickness of 10 μm, and dried at 60° C. for five minutes. Each of the coating compositions No.1—1, 1—3 and 1—4 was then applied to a dry thickness of 60 μm, and dried at 70° C. for 30 minutes.

All the samples showed good test results, with no dew condensation observed and no lifting of the coated film was observed even after 60 minutes, clearly indicating the effect of priming.

EXAMPLE 6 [EXAMPLE FOR INVENTION (B)]

Coating composition No.2P was diluted with Ureol No.4 thinner (Kawakami Paint) at a ratio of 100:50, applied on a panel to a dry thickness of 20 to 25 μm, and dried at 70° C. for 15 minutes. Each of the coating compositions, No.2—1, 2—3 and 2—4, was then applied to a dry thickness of 80 μm and dried at 80° C. for 60 minutes. No dew condensation was observed at all, and adhesion to the substrate was also very good.

COMPARATIVE EXAMPLE 2 [EXAMPLE FOR INVENTION (B)]

Separation and coagulation were observed with composition No.2—2, and no applicable paint could be obtained.

EXAMPLE 7

Coating tests were carried out in the same manner as in Example 6 except that panels coated with a two-pack wash primer were used. The test results were as good as in Example 6.

EXAMPLE 8

Each of the coating compositions, No.3—1, 3—3 and 3—4, was diluted with Ureol No.4 thinner at a ratio of 100:70, coated to a dry thickness of 80 /μm, and dried at 80° C. for 40 minutes. All the samples showed good test results, with no dew condensation observed.

COMPARATIVE EXAMPLE 3 [EXAMPLE FOR INVENTION (B)]

Separation and coagulation were observed with composition No.3—2, and no applicable paint could be obtained.

EXAMPLE 9 [EXAMPLE OF INVENTION (B)]

UP Primer (Kawakami Paint) was coated on a panel to a dry thickness of about 5 to 7 μm, and allowed to stand for ten minutes. Each of the coating compositions, No.3-1, 3-3 and 3-4, prepared in Example 8 was then applied to a dry thickness of 80 μm and dried at 80° C. for 40 minutes. No dew condensation was observed at all and no lifting of the coated film was observed even after 60 minutes.

EXAMPLE 10 [EXAMPLE FOR INVENTION (B)]

Composition No.3P was diluted with Ureol No.4 thinner at a ratio of 100:70, coated to a dry thickness of about 20 to 25 μm, and dried at 70° C. for ten minutes. Each of the coating compositions, No.3-1, 3-3 and 3-4, prepared in Example 8 was then applied to a dry thickness of 80 μm and dried at 80° C. for 40 minutes. No dew condensation was observed at all and no lifting of the coated film was observed even after 60 minutes.

TABLE 1

| Polymer No. | Water-swellable polymer emulsion | | | | | |
|---|---|---|---|---|---|---|
| | Composition (mol %) | | | Polymer Content (Weight %) | Water Content (Weight %) | Average Particle size (μm) |
| | AA | AMD | DM | | | |
| I | 100 | | | 40 | 43 | 3.8 |
| II | 100 | | | 50 | 10 | 3.6 |
| III | | 100 | | 30 | 58 | 4.2 |
| IV | | | 100 | 40 | 43 | 4.5 |

AA: Sodium acrylate, Ammonium acrylate
AMD: Acrylamide
DM: Quarternary salt of dimethylaminoethyl methacrylate with methyl chloride

TABLE 2

| | Composition and Result | | | | | | | | | | |
|---|---|---|---|---|---|---|---|---|---|---|---|
| | No. | | | | | | | | | | (wt %) |
| Raw Materials | 1 | 2 | 3 | 4 | 5 | 6 | 7 | 8 | 9 | 10 | 11 |
| Acrydic A-186 (NV55) NAD | 23.0 | 25.0 | 25.0 | | | | | | | | |
| Acrydic A-187 (NV55) NAD | | | | 73.0 | 40.0 | 90.0 | 66.0 | 66.0 | | | |
| Acrydic A-188 (NV52) (Polymer solution) | 16.2 | 17.0 | 17.0 | | | | | | | | |
| Hitaloid 3098 (Polymer solution)* | | | | | | | | | 52.0 | | 52.0 |
| Ftalkyd 133-60 (Polymer solution)** | | | | | | | | | | 33.0 | |
| U-Van 20SE (Polymer solution)*** | | | | | | | | | | 17.0 | |
| Titanium oxide (rutile) | 20.0 | 21.0 | 21.0 | | | | | | 28.0 | 25.0 | 28.0 |
| Kaolin | 17.0 | 18.0 | 18.0 | | | | | | | | |
| Celite | 5.0 | 6.0 | 6.0 | | | | | | | | |
| Polymer I (NV40) | | | | 17.0 | | | 34.0 | | 20 | | |
| Polymer IV (NV40) | | | | | | 10.0 | | 34.0 | | | 20 |
| Polymer III (NV30) | | | | | 60.0 | | | | | 25.0 | |
| Polymer II (NV50) | 18.8 | 7.0 | 5.0 | | | | | | | | |
| Mineral spirit | — | 11.8 | 6.0 | | | | | | | | |
| Total | 100 | 100 | 100 | 100 | 100 | 100 | 100 | 100 | 100 | 100 | 100 |
| Water-absorbent resin (in Solid) | 12.9 | 5.2 | 3.6 | 17.5 | 45.0 | 7.47 | 27.1 | 27.3 | coagulation | | |
| Dew condensation | | | Δ~× | | | ~ | | | | | |

*Acrylpolyol resin solution, Hitachi Kasei, NV 50%
**Alkyd resin solution, Hitachi Kasei, NV 60%
***Melamine resin solution, Mitsui Toatsu Chemicals, NV 50%

TABLE 3

| | Water-swellable polymer emulsion | | | | | |
|---|---|---|---|---|---|---|
| Polymer No. | Composition (mol %) | | | Polymer Content (Weight %) | Water Content (Weight %) | Average Particle size (μm) |
| | AA | AMD | DM | | | |
| 1 | 100 | | | 50.0 | 10.3 | 3.8 |
| 2 | 100 | | | 45.1 | 25.0 | 4.0 |
| 3 | | 100 | | 50.0 | 10.3 | 4.2 |
| 4 | | | 100 | 50.0 | 10.3 | 3.9 |

AA: Sodium acrylate
AMD: Acrylamide
DM: Quarternary salt of dimethylaminoethyl methacrylate with methyl chloride

TABLE 4

| | Coating Composition (Weight parts) | | | | | | | | | | | | | | |
|---|---|---|---|---|---|---|---|---|---|---|---|---|---|---|---|
| | Composition No. | | | | | | | | | | | | | | |
| | 1-1 | 1-2 | 1-3 | 1-4 | 1 P | 2-1 | 2-2 | 2-3 | 2-4 | 2 P | 3-1 | 3-2 | 3-3 | 3-4 | 3 P |
| (1)Acrydic 52-340 (NV40%) | 56.0 | 56.0 | 56.0 | 56.0 | 65.0 | | | | | | | | | | |
| (2)Acrydic 49-395 (NV50%) OH value 25 | | | | | | | | | | | 42.0 | 42.0 | 42.0 | 42.0 | 60.0 |
| (3)Takelack U-25 (NV75%) OH value 130 | | | | | | 48.0 | 48.0 | 48.0 | 48.0 | 48.0 | | | | | |
| (4)Titanium CR-90 | 20.0 | 20.0 | 20.0 | 20.0 | 25.0 | | | | | | 20.0 | 20.0 | 20.0 | 20.0 | 30.0 |
| Cellosolve acetate | | | | | | 3.0 | 3.0 | 3.0 | 3.0 | 5 | 1.4 | 1.4 | 1.4 | 1.4 | 2 |
| Butyl acetate | | | | | | 3.0 | 3.0 | 3.0 | 3.0 | 5 | 2.1 | 2.1 | 2.1 | 2.1 | 3 |
| Xylene | 8.0 | 8.0 | 8.0 | 8.0 | 10.0 | 6.0 | 6.0 | 6.0 | 6.0 | 10 | 3.5 | 3.5 | 3.5 | 3.5 | 5 |
| 1% SF-69 Silicone | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| 1% L-720 Silicone | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Polymer 1 | 20.0 | | | | | 40 | | | | | 30 | | | | |
| Polymer 2 | | 20.0 | | | | | 40 | | | | | 30 | | | |
| Polymer 3 | | | 20.0 | | | | | 40 | | | | | 30 | | |
| Polymer 4 | | | | 20.0 | | | | | 40 | | | | | 30 | |
| *(5)Vernock DN-950 (NCO % 12.5, NV 75%) | | | | | | 28.3 | 28.3 | 28.3 | 28.3 | 47.0 | | | | | |
| *(6)Sumidule N-75 (NCO % 16.5, NV 75%) | | | | | | | | | | | 6.3 | 6.3 | 6.3 | 6.3 | 9.0 |
| Elongation (%) | 80 | 80 | 80 | 80 | | 50 | 50 | 50 | 50 | | 70 | 70 | 70 | 70 | |
| Water-swellable polymer %/NV | 19 | 19 | 19 | 19 | | 26 | 26 | 26 | 26 | | 22.8 | 22.8 | 22.8 | 22.8 | |

*Parts per 100 parts main ingredients
(1), (2), (5): Dic, (3): Takeda, (4): Ishihara, (6): Sumitomo-Bayer

What is claimed is:

1. A water-absorbent coating composition comprising:
   (i) a non-aqueous dispersion of a resin selected from the group consisting of polymers of at least one of styrene, vinyl acetate and acrylic ester monomers and
   (ii) a water-in-oil type emulsion of a water-swellable polymer prepared by emulsifying an aqueous solution of a water-soluble vinyl monomer and a crosslinkable monomer wherein said crosslinkable monomer is selected from group consisting of a divinyl compound, a methylol vinyl compound, a vinyl aldehyde compound, or methylacrylamide glycolate methyl ether in an organic dispersion medium containing a hydrophobic surface-active agent and polymerizing the monomer emulsion thus obtained by the use of a free-radical initiator.

2. The coating composition according to claim 1 wherein the water-in-oil type emulsion of a water-swellable polymer is prepared by dehydrating the emulsion during and/or after polymerization, under reduced pressure.

3. The water-absorbent coating composition according to claim 2 wherein the water-in-oil type emulsion of water-swellable polymer has a water content of less than 25% after dehydration.

4. The coating composition according to claim 1 wherein the non-aqueous dispersion is present at 100 parts by weight (on a solid basis) per about 8 to 150 parts by weight (on a solid basis) of the water-in-oil type emulsion.

5. The water-absorbent coating composition according to claim 1 wherein the water-swellable polymer is said water-in-oil type emulsion has an average particle size of not greater than 10 μm.

6. The water-absorbent coating composition according to claim 1 which additionally contains a resin solution.

7. The water-absorbent coating composition according to claim 2 which additionally contains a resin solution.

* * * * *